April 24, 1956     G. L. FERNSLER     2,743,379
SWEEP VOLTAGE SYSTEMS
Filed Dec. 9, 1953
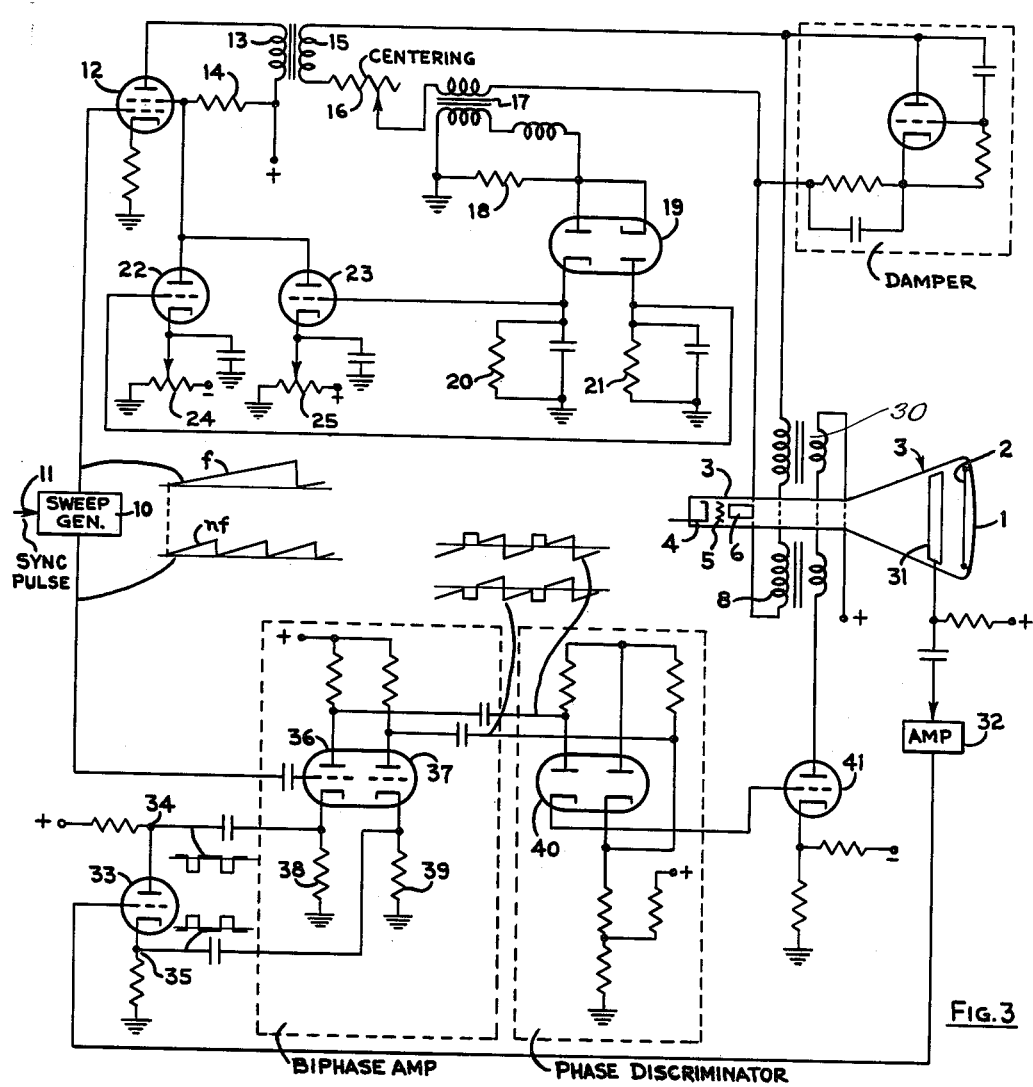
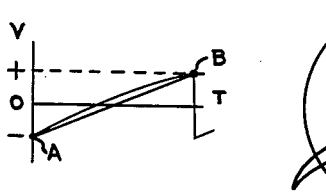
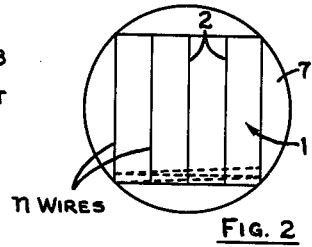
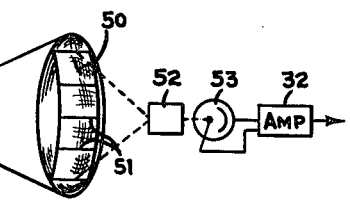
Fig. 1     Fig. 2     Fig. 4
INVENTOR.
GEORGE L. FERNSLER

United States Patent Office 2,743,379
Patented Apr. 24, 1956

2,743,379
SWEEP VOLTAGE SYSTEMS

George L. Fernsler, Pennington, N. J., assignor, by mesne assignments, to the United States of America as represented by the Secretary of the Navy Application December 9, 1953, Serial No. 397,287

5 Claims. (Cl. 315—12)

My invention relates to sweep voltage systems and to means for predetermining the configuration of the time-displacement pattern of the scanning beam of a cathode ray tube.

The need for precisely predetermining time-displacement patterns was possibly first recognized when it was desired to televise a common scene with more than one television camera. Where the video signals contain several flying spots, these flying spots must register precisely in displacement and in time.

It has been demonstrated to be impractical to feed sweep voltages from a single generator to a plurality of remotely located cameras, where precise registration is required. Further, where a sweep voltage generator is placed at each cathode ray tube it was found that the sweep patterns would not change uniformly with time and with changing parameters, such as ambient temperature, of the generator circuit. This required that an operator constantly check registration and make corrections accordingly.

An object of my invention is a system in which the time-displacement pattern of a scanning cathode ray may be predetermined within narrow limits.

Another object of my invention is a system in which a time-displacement pattern of a scanning cathode ray will remain constant even with changing parameters of the sweep voltage generator for the cathode ray.

A more specific object of my invention is a sweep voltage system in which the ends as well as the intermediate points of a recurring trace may be accurately held to a predetermined pattern.

Other objects and features of my invention will appear in the following description of a preferred embodiment of my invention which is defined with particularity in the appended claims and which is shown in the accompanying drawing in which Fig. 1 shows the time-displacement pattern of a typical cathode ray, Fig. 2 shows the raster of the screen of a cathode ray tube of my invention, Fig. 3 shows diagrammatically a circuit embodying my invention, and Fig. 4 shows novel means for detecting the position of a flying spot.

The electron gun of a conventional cathode ray tube focuses the beam at the center of the planar target or screen normal to the axis of the tube. In the familiar rectilinear scan, the beam is deflected from one side of the raster to the other according to some such time-voltage pattern as shown in Fig. 1. The voltage must vary between some negative value A and some positive value B to deflect the beam from one margin to the other of the raster. The maximum positive and negative voltages determine the location of the margins of the raster. Ideally, the voltage values A and B remain fixed and the time-voltage variation is a straight line between these two maximums, but seldom is this ideal realized. Where the sawtooth wave of the sweep generator must be produced by the decay of a charge on a condenser it is impossible to obtain a straight line time-voltage characterization. Even though it is possible to initially set the peak values of the wave and to establish the margins of the raster, as with current or voltage limiting devices or with voltage clamps, it is not obvious how the peaks can be prevented from drifting nor how intermediate points on the time-voltage curve may be changed. Unfortunately, the peaks and the curvature between the peaks change as the temperature, random ground capacities, and other parameters change.

I propose, according to my invention, to (1) establish the two peak values of the deflection current, and (2) to return the deflection voltage to predetermined levels at a plurality of intermediate points between the peak values. In Fig. 2, for example, the raster 1 of the cathode ray tube target or screen of my invention is divided by several parallel lines 2 perpendicular to the direction of sweep of the beam. The lines contemplated may be either grid wires within the cathode ray tube and across which the beam may sweep to produce electrical pulses, or the lines may be opaque marks on the inside or outside of the screen and which will cast a light shadow as the beam spot passes.

First the circuitry for obtaining fixed peak deflection currents will be described. In Fig. 3 the cathode ray tube 3 includes the usual electron beam source with cathode 4 controlling grid 5 focusing electrodes 6 and screen 7. In this particular embodiment a plurality of parallel evenly spaced fine wires 2 are stretched across and in front of the screen so that during horizontal deflection, say, the beam successively impinges the wires. There may be $n$ number of parallel wires, three being shown by way of example. Deflection coils 8 deflect the beam horizontally across the screen. The sawtooth wave for deflection coils 8 are generated in the sawtooth generator 10 of any conventional construction. The period $f$ of the sawtooth generated at 10 is under the control of a synchronizing pulse received on line 11. Line 11 may extend to one or more other systems similar to that shown in Fig. 3. The output of generator 10 comprises a sawtooth wave of frequency $f$ which in the example assumed is the desired horizontal deflection frequency of the cathode ray tube. Also in the output of generator 10 is obtained a sawtooth wave of frequency $nf$, the $n$ being an integral number equal to the number of grid wires or vertical lines across which the beam passes each horizontal excursion. The sawtooth wave $f$ is amplified in the screen grid amplifier 12. The anode voltage for the amplifier 12 is applied through the primary 13 of a coupling transformer and the screen grid voltage is applied through the load resistor 14. As will appear hereinafter the screen grid at the end of load resistor 14 is modulated by an automatic control voltage obtained from the deflection yoke current. The secondary 15 of the coupling transformer is connected across the deflection yoke 8, one of the coupling leads being serially connected through the centering resistor 16 and the primary of sampling transformer 17. Voltages of both polarities A and B, Fig. 1, are produced across the terminals of resistor 18, the amplitudes of the two voltages being proportional to the two peak values of the yoke current. The two currents representative of the two peak voltages are rectified in the two halves of rectifier 19 to apply across load resistors 20 and 21, pulses proportional, respectively, to the two currents. The voltages across resistance 20 and 21 are applied directly to the inputs of amplifiers 22 and 23. The anodes of amplifiers 22 and 23 are connected in parallel and to the screen grid end of load resistor 14. The bias on amplifiers 22 and 23 are preferably manually adjustable, as by potentiometers 24 and 25 in their cathode circuits, to individually set the two peak voltages, A and B.

In operation, the screen grid voltage is increased or decreased degenerately at the extremes of each sawtooth voltage excursion to keep the overall amplification of amplifier 12 at such a level that the sampled voltages at 17 and peak currents through yoke 8 remain constant. After adjustment of the two cathode potentiometers 24 and 25 to determine respectively the two margins of the raster, any tendency of either margin to drift is automatically compensated for by my novel feed back circuit.

Assume now that the two peak yoke currents have been set to the desired value and that the voltage points A and B, referring to Fig. 1, have been established and that the beam is scanning repeatedly across the raster, the time-displacement pattern corresponding to curve C. Assume next that the temperature of the circuits change, or that the characteristics of the deflection circuitry changes, so that the time-displacement pattern drifts to curve D. At times $t_1, t_2 \ldots t_n$ during an excursion the deflection voltage V changes from the optimum on curve C to some other value on curve D. This means that the beam arrives at each point $t_1, t_2 \ldots t_n$ in its excursion ahead of or behind the optimum arrival time. According to my invention the time phases of the beam at points $t_1, t_2 \ldots t_n$ are determined, are compared to the optimum deflection voltage, C, and the deflection power momentarily increased or decreased to bring the beam back into proper time phase at each point. By a series of such step corrections it has been determined that the maximum variation of the deflection voltage from optimum can be held to less than 1%. The number of corrections per excursion depends on the number of markers 7, and is a matter of choice to the designs.

Means for modifying the curvature of the time voltage pattern of the sweep will now be described. In the particular cathode ray deflection system illustrated where the yoke 8 provides the horizontal deflection power to the tube, it has been found desirable to superimpose a second or auxiliary yoke 30 upon yoke 8. Alternatively, the auxiliary beam deflecting power could be applied directly to yoke 8. According to my invention, coil 30 aids or bucks the field produced by coil 8 each instant the beam crosses a grid marker or wire 7. As will appear, the amplitude of the auxiliary fields produced by coil 30 is proportional to the magnitude of the lag or lead in time of the beam with respect to the pattern of the control wave nf, obtained at sweep generator 10. The control wave has the optimum pattern, C, in that it is the wave transmitted to a plurality of cathode ray tubes the scansions of which must register.

In the beam phase detecting embodiment shown, impingement of the beam upon the marker wire 7 is detected by a ring 31 encircling the screen and held at a slightly higher potential than the second anode of the tube to receive the secondary emission produced at the grid wires by the beam. The pulses produced as each grid wire is successively struck by the beam is amplified at 32 and then applied to the cathode follower 33. Each positive and negative pulses are applied, respectively, to the inputs of amplifiers 36 and 37 by coupling terminals 34 and 35 to the cathode ends of load resistors 38 and 39. The control grids of amplifiers 36 and 37 are connected in parallel and are coupled through a coupling condenser to the nf output of the generator 10. The outputs of amplifiers 36 and 37 are coupled, respectively, through the full wave phase discriminator 40 to the input of the current control tube 41. The biphase amplifier and phase discriminator per se are not claimed as my invention. It will now appear that the time phase of the pulses appearing at points 34 and 35 will advance or recede depending upon the time of arrival of the beam at one of the grid wires 7. It follows that by combining the pulse information at the cathodes with the reference sawtooth voltage on the grids of amplifiers 36 and 37 that the amplitude of the output pulses applied to control tube 41 is a function of the time phase of the beam at the grid wires. We now have a beam deflection current at coil 30 capable of accelerating or retarding the beam deflection in response to its lag or lead position on the grid wires.

If a cathode ray tube of more conventional construction is desired, the position of the flying spot may be monitored by a phototube. Referring to Fig. 4, a mask 50 comprising a thin transparent sheet of glass or plastic is applied directly to the outer face of the screen. On the mask are ruled fine opaque parallel lines 51, the number of lines corresponding to the number of phase adjustments per spot excursion desired. An optical system comprising appropriate lens for viewing the entire screen is positioned in front of the screen and focuses the spot on the phototube or other light sensitive device 53. Adjustments are made so that the shadow cast by a line 51 will produce a measurable signal at the terminals of the phototube. After amplification at 32, the signal is compared with the nf sawtooth wave as described in connection with Fig. 3. The mask with its lines 51 could of course be inserted elsewhere in the optical system, as between the lens and phototube.

My improved system insures a predetermined time-displacement pattern for a scanning cathode ray, including predetermination of the ends and intermediate portions of the scan.

I claim:

1. In combination, a cathode ray tube with a cathode beam source, a planar target across which the beam may scan, beam deflecting means and a connected sweep voltage source for sweeping said beam across said target along a voltage-time trace of predetermined configuration, parallel wires responsive to said beam for measuring the time phase of said beam at spaced points in the path of said trace each excursion of said beam, a source of saw tooth waves having a period corresponding to the beam travel time between wires and means for comparing the time phase of the beam at said point with the time phase of a corresponding point on the saw tooth wave, and means producing a pulse the amplitude of which is a function of the difference of the two time phases, and means responsive to said pulse modifying the configuration of the first mentioned trace.

2. In combination, a cathode ray tube, primary means for deflecting the cathode ray beam along a predetermined trace across the screen of said tube, a generator of saw tooth waves of frequency $f$ coupled to said means; means to modify the deflecting field of said primary means during excursions of said beam across the screen including a source of saw tooth waves of frequency $nf$, where $n$ is a whole number, and $n$ beam locating detectors, evenly spaced along said trace means responsive to signals from said detectors and to signals from the $nf$ saw tooth source for measuring the time phase of the beam at each detector and coupled to the mentioned field modifying means for modifying said field $n$ times during each excursion.

3. In combination in a system to obtain registration between a plurality of sweep voltage wave forms, a generator of a reference sweep voltage wave form of frequency $f$ and of a sweep voltage of multiple frequency $nf$, where $n$ is a whole number, a cathode ray tube with beam deflection means, the $f$-wave of the generator being coupled to said beam deflection means; means responsive to the cathode ray beam to produce an $n$ number of voltage pulses at evenly spaced points in each excursion of said beam, and means comparing the time phase of said pulses with the $nf$-sweep voltage at the instant the pulse voltage occurs, and means responsive to the comparing means applying a correcting deflection voltage to said deflecting means.

4. In combination, a cathode ray tube, means for deflecting the cathode beam of said tube in accordance with a voltage repetitiously sweeping between two predetermined peak voltages, a generator for the sweep voltage, a power amplifier coupling the generator to the beam deflecting means, means for sampling the two peak values of current, rectifiers coupled to said sampling means for producing positive and negative voltages analogous, respectively, to said peak values, two voltage amplifiers, the outputs of the voltage amplifiers being coupled in parallel and to a gain control electrode of said power amplifier, the inputs of the voltage amplifiers being coupled, respectively, to said rectifiers.

5. In combination, a cathode ray tube, beam deflection means for said tube, a raster sweep generator of one frequency coupled to said deflection means and a multiple frequency sweep generator; pulse producing means responsive to the passage of the cathode ray beam past the predetermined point, means adding said pulse to a sawtooth voltage wave of said multiple frequency generator to produce a resultant voltage which is a function of the time phase of said beam at said point, and means associated with said beam deflection means and coupled to the adding means for selectively accelerating or retarding the sweep of said beam.

References Cited in the file of this patent

UNITED STATES PATENTS

| | | |
|---|---|---|
| 2,466,537 | De Vore | Apr. 5, 1949 |
| 2,594,513 | Stocker | Apr. 29, 1952 |